(12) United States Patent
Willing

(10) Patent No.: US 6,204,923 B1
(45) Date of Patent: Mar. 20, 2001

(54) DEVICE FOR COLOR MATCHING OR COLOR MEASUREMENT

(75) Inventor: Achim Willing, Schesslitz/Burgellern (DE)

(73) Assignee: Dr. Ing. Willing GmbH (DE)

( * ) Notice: Subject to any disclaimer, the term of this patent is extended or adjusted under 35 U.S.C. 154(b) by 0 days.

(21) Appl. No.: 09/333,205

(22) Filed: Jun. 15, 1999

(30) Foreign Application Priority Data

Jun. 15, 1998 (DE) .............................................. 198 26 533

(51) Int. Cl.$^7$ ....................................................... G01J 3/46
(52) U.S. Cl. ............................................. 356/402; 356/425
(58) Field of Search ................................... 356/402, 405, 356/406, 407, 416, 419, 425, 445, 446, 340; 250/226

(56) References Cited

U.S. PATENT DOCUMENTS

| | | | |
|---|---|---|---|
| 2,406,166 | * 8/1946 | Scott | 356/405 |
| 3,519,360 | * 7/1970 | Kudlek | 356/425 |
| 4,344,709 | * 8/1982 | Provder et al. | 356/446 |

FOREIGN PATENT DOCUMENTS 0 379 168 A2  7/1990 (EP) .

* cited by examiner

*Primary Examiner*—F L Evans
(74) *Attorney, Agent, or Firm*—Marshall & Melhorn

(57) ABSTRACT

An apparatus is proposed for the color matching or colorimetry of colored samples, which are arranged in a sample support. It comprises a lighting device which illuminates the sample in a main beam direction and an observer provided at an observation position or a measuring device arranged at an observation position, the sample and observation position having a fixed coordination with each other. The sample and the lighting device are arranged in fixed coordination with each other and, to set different angles of observation between the direction of observation from the observation position to the sample and the main beam direction, the sample and the lighting device are pivotable about a common axis of rotation.

9 Claims, 7 Drawing Sheets

DEVICE FOR COLOR MATCHING OR COLOR MEASUREMENT

BACKGROUND OF THE INVENTION

1. Field of the Invention

The invention concerns an apparatus for the color matching or colorimetry of colored samples according to the introductory part of the main claim.

2. Description of the Prior Art

Apparatuses for colorimetry and apparatuses for color matching are known in which these apparatuses are basically each constructed differently, so that often no correspondence is achieved between the colorimetry and the visual color impression, owing to the different geometries.

With ordinary colorimetry the starting point is a sample which is fixed in place relative to the measuring device and which is illuminated from various given angles and usually observed perpendicularly to the surface. With these apparatuses the devices are arranged in the immediate vicinity of the surface, and only very small surface fractions are observed.

For the color matching of smaller samples, e.g. in DIN A4 format, small lighting cubicles are usual, e.g. cubicles arranged on tables, in which is mounted a stationary lighting system for irradiating the samples. To detect the different color effects, the sample surfaces are presented to an observer from different angles and so each lit from different angles. From EP 0 379 168 A2 is known a matching chamber of this kind. With this known matching chamber there is the drawback of poor reproducibility, because both then angles of illumination and the angles of observation change in different observation situations, and in particular color effects are difficult to detect.

SUMMARY OF THE INVENTION

It is therefore the object of the invention to provide an apparatus for color matching or colorimetry which allows color matching or colorimetry with good reproducibility and clearly defined different conditions of illumination and observation, and with which color effects can be detected easily as well.

This object is achieved according to the invention by the characteristics of the main claim.

According to the invention the sample to be inspected or measured and the lighting device which illuminates the sample are arranged in fixed geometrical relation to each other, the fixed geometrical relation also being maintained when the sample surface is pivoted to set different angles of observation. This can be achieved by a lighting device which is rigidly connected to the sample or samples or to the sample holder and which follows every pivoting and movement of the sample on account of the rigid connection and hence always causes constant lighting conditions even when the angles of observation are changed.

Preferably the lighting device is dimensioned and positioned in such a way that the sample is illuminated from angles equal to or greater than 45° to its normal. This can be done with point light sources, i.e. ones which are compact in practice, but it turned out that particularly high correlations or correspondence to the matchings which are carried out outdoors, i.e. in daylight, were produced when using linear or tubular light sources.

A particularly big advantage lies in that the apparatus can be used both for color matching and for colorimetry, the construction remaining the same and only the visual observer being replaced by a colorimetric device or by suitable receivers of the colorimetric device which spectrally evaluate the beam density of the sample.

The bulbs or lights if necessary with suitable filtering are selected in particular for visual matching in such a way that their spectral distribution corresponds to the predetermined matching conditions, e.g. a color temperature of 6500 Kelvin and a high enough index of metamerism for daylight. Suitably selected fluorescent lamps are suitable for this.

Angles of observation which can be defined by the angular distance from the main beam direction of illumination, for example 25°, 45° and 75°, proved to be particularly efficient.

Advantageously lamps with different spectral light distribution which are connected to each other by a rotating or pivoting device can be provided for testing samples for metamerism, the respective selected bulb being moved by rotation or pivoting into the respective nominal position.

BRIEF DESCRIPTION OF THE DRAWINGS

Practical examples of the invention are shown in the drawings and described in more detail in the description below. They show.

DESCRIPTION OF THE PREFERRED EMBODIMENT

Figure 1:
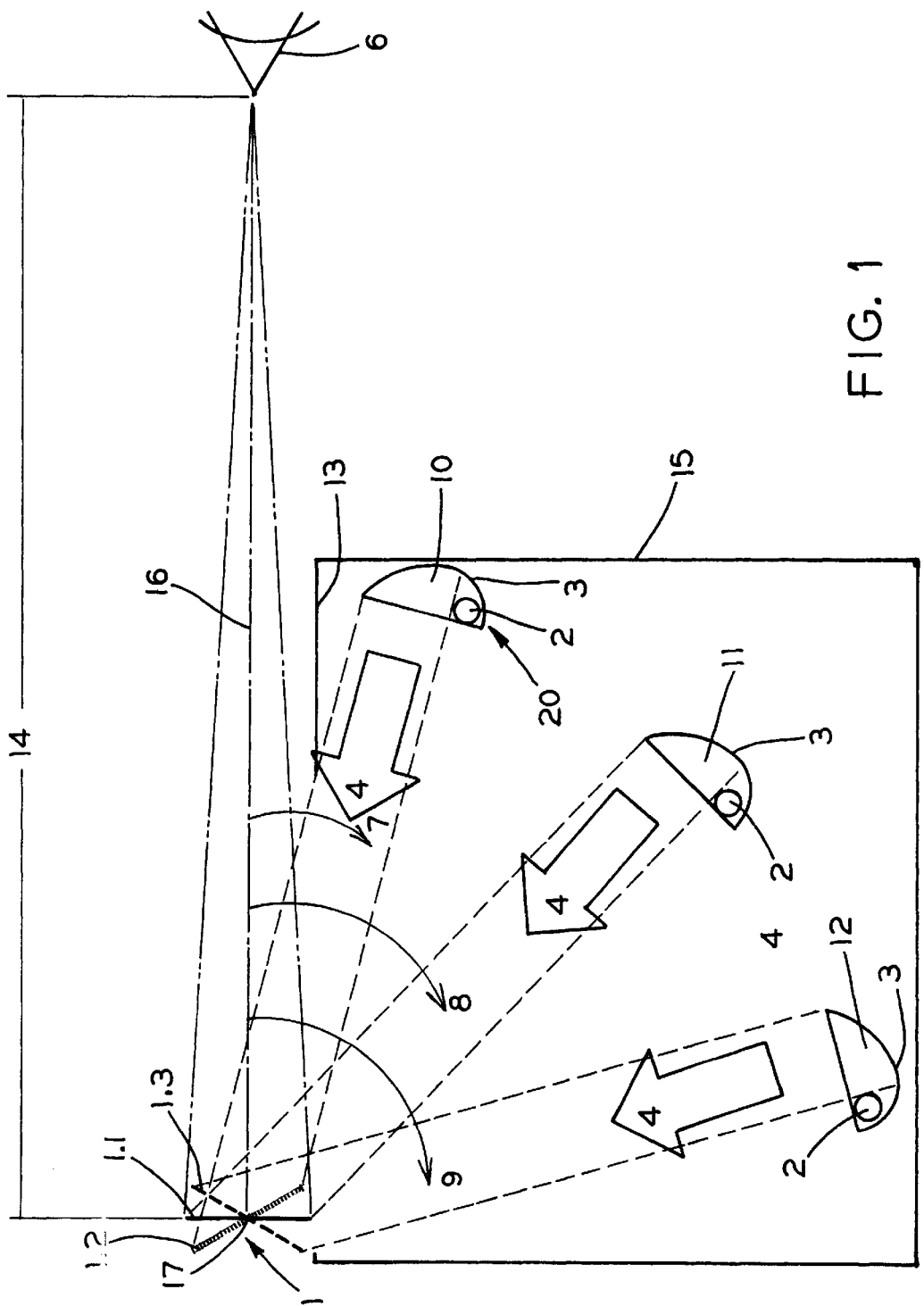
FIG. 1 a vertical section through a practical example of the present invention.
Figure 2:
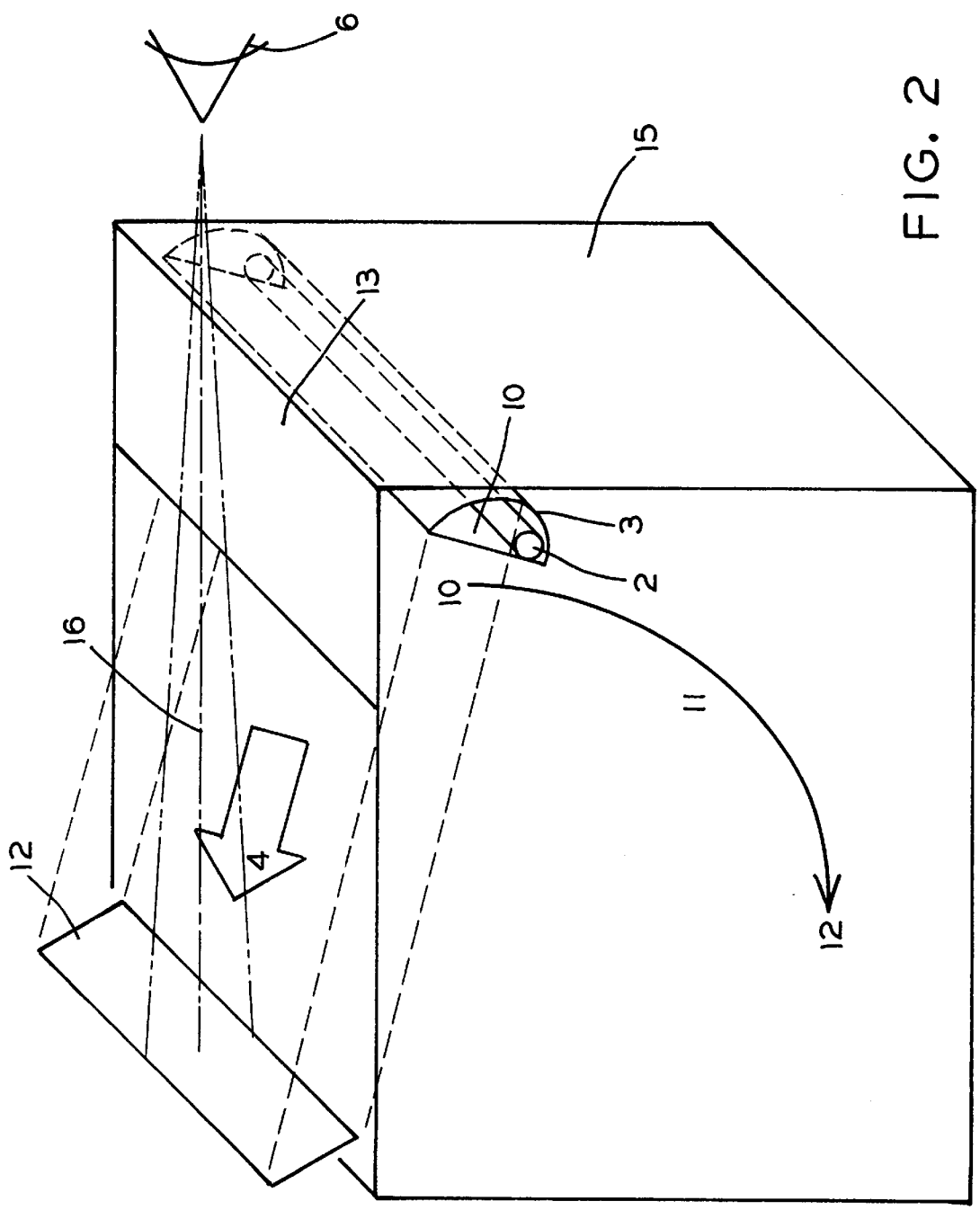
FIG. 2 a schematic perspective view of the apparatus according to FIG. 1.

The apparatus shown in FIG. 1 and FIG. 2 for the measurement and/or visual matching of colors and/or color effects of a colored sample comprises a housing 15 which is for example designed as a table box and in which is accommodated a lighting device 20. The lighting device 20 emits a light beam 4 which is directed onto a sample 1 with a colored coating or lacquering or the like, which is relatively small and for example can be of the order of magnitude of DIN A4. The sample which is illuminated by the light beam 4 at an oblique angle, preferably at about 45°, is held and fixed in a sample holder, not shown. The lighting device comprises a bulb, in the embodiment shown an elongate fluorescent lamp and a light-focusing reflector 3. As can be seen from FIG. 2, the reflector 3 is channel-like. The sample 1 in the embodiment shown is located outside the housing or table box 15, which is at least partly open at the top so that the light beam 4 can irradiate the sample 1.

6 denotes an observation position which is arranged at a given distance 14 from the sample 1, for example a reading distance of 600 mm or more. At the observation position is located either an observer or a colorimetric device. For the purpose of observation, from the observation position 6 to the sample 1 a beam path or conical channel 16 is kept free to allow free observation. The view of an observer at the observation position 6, but also the receiver of the colorimetric device, is screened off from the lighting device 20 by at least one screen 13, so that readaptations are prevented by screening. The observation position 6 and the sample 1 have a fixed coordination with each other, an observer being able to see through an eyepiece, not shown, or maintain a fixed distance by means of a stop or the like aid. Free observation is possible too, particularly with trained personnel. Naturally the conical channel can be bounded by suitable channel walls, not shown, and form part of the housing.

The sample 1 is pivotable about an actual or imaginary axis of rotation 17, this axis of rotation in the basic diagram according to FIG. 1 being the horizontal centre axis of the sample 1, an imaginary axis of rotation meaning that rotation of the sample support is performed by an actual rotating device mounted outside the sample. In the actual embodiment the axis of rotation 17 could be located slightly outside the sample, but it should be as close as possible to the sample 1.

The lighting device or lamp 20 is rigidly connected to the sample 1 or sample holder in such a way as to be pivoted together with the sample about the axis of rotation 17, i.e. sample 1 and lighting device 20 are in fixed coordination with each other and are pivoted together about the axis of rotation 17. In FIG. 1 are shown three different positions of the lighting device, namely positions 10, 11 and 12, and correspondingly three different positions of the sample 1, namely 1.2, 1.1 and 1.3. The different angles of observation are marked 7, 8 and 9. As a result both the color on the sample 1 can be detected and effects associated with the different angles of observation 7, 8, 9.

In FIG. 2 the arrangement according to FIG. 1 is shown in perspective, only one position of the lighting device 20 and sample 1 being shown here, namely positions 10 and 1.2.

Figure 3:
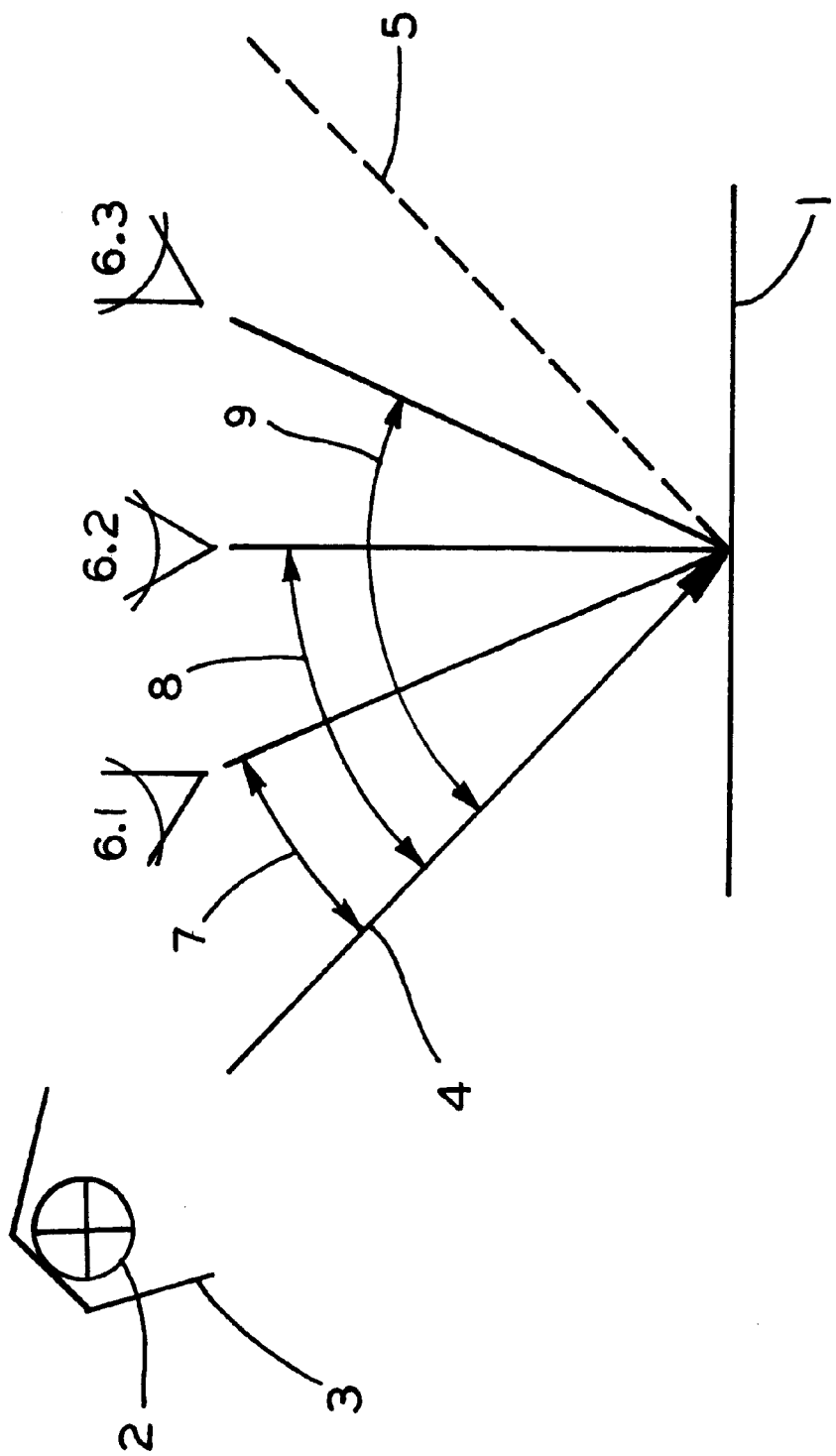
FIG. 3 a schematic view of the illumination of a sample and observation thereof with different angles of observation.

In FIG. 3 the different directions of incidence, reflection and observation are shown schematically in one figure, the sample being shown as a horizontal line and the directions of observation being shown differently. The sample is illuminated by the light beam 4 from the bulb 2 and the light-focusing reflector 3 at an oblique angle, preferably at about 45°. The reflection of this light beam 4 is shown by the light beam 5. Between the light beams 4 and 5 are located the directions of observation 6.1, 6.2 and 6.3 which differ from the main beam direction of the light beam 4 in the angles of observation 7, 8 and 9.

Figure 4:
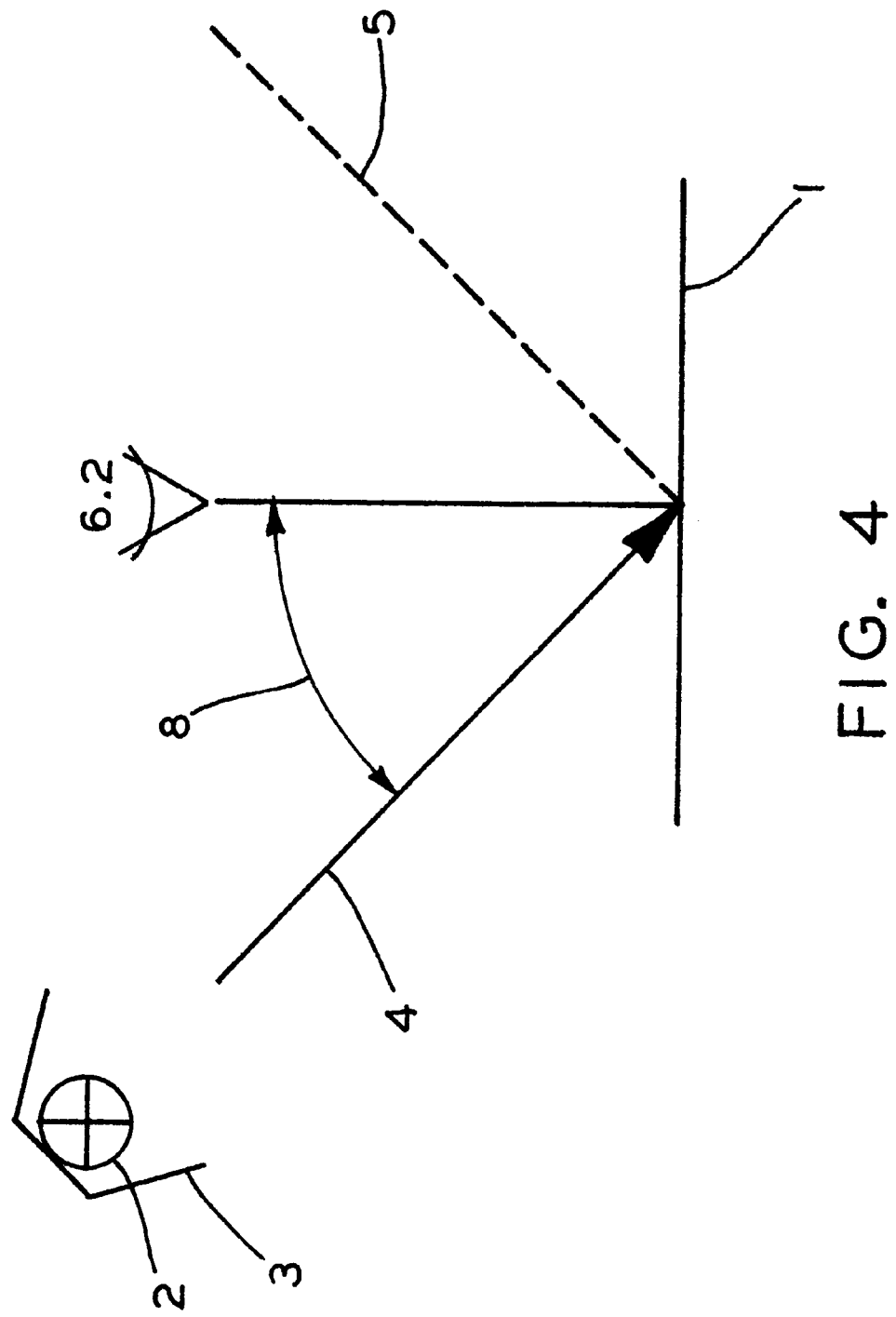
FIGS. 4 to 6 views according to FIG. 3 with different angles of observation but the same direction of observation.
Figure 5:
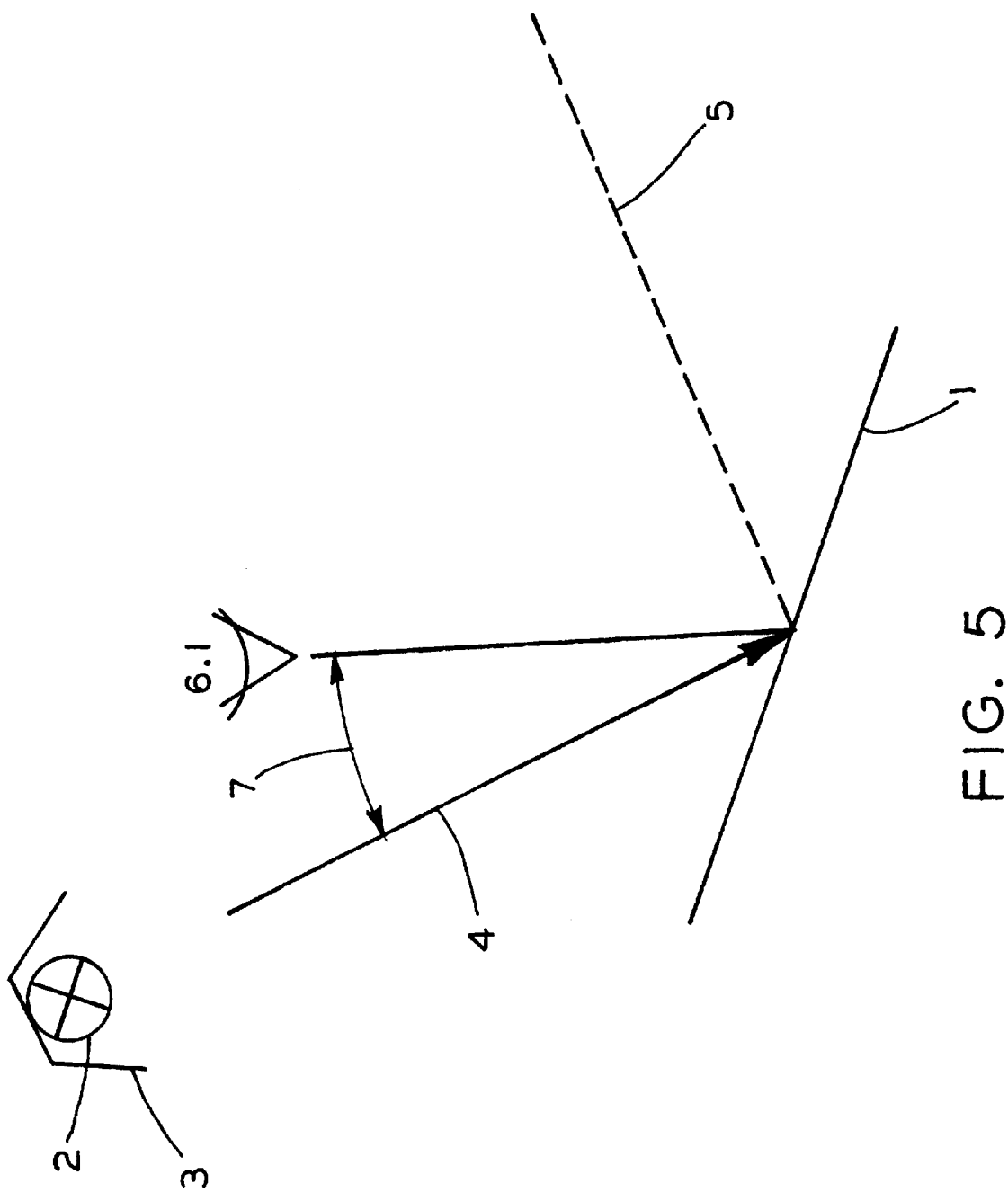
Figure 6:
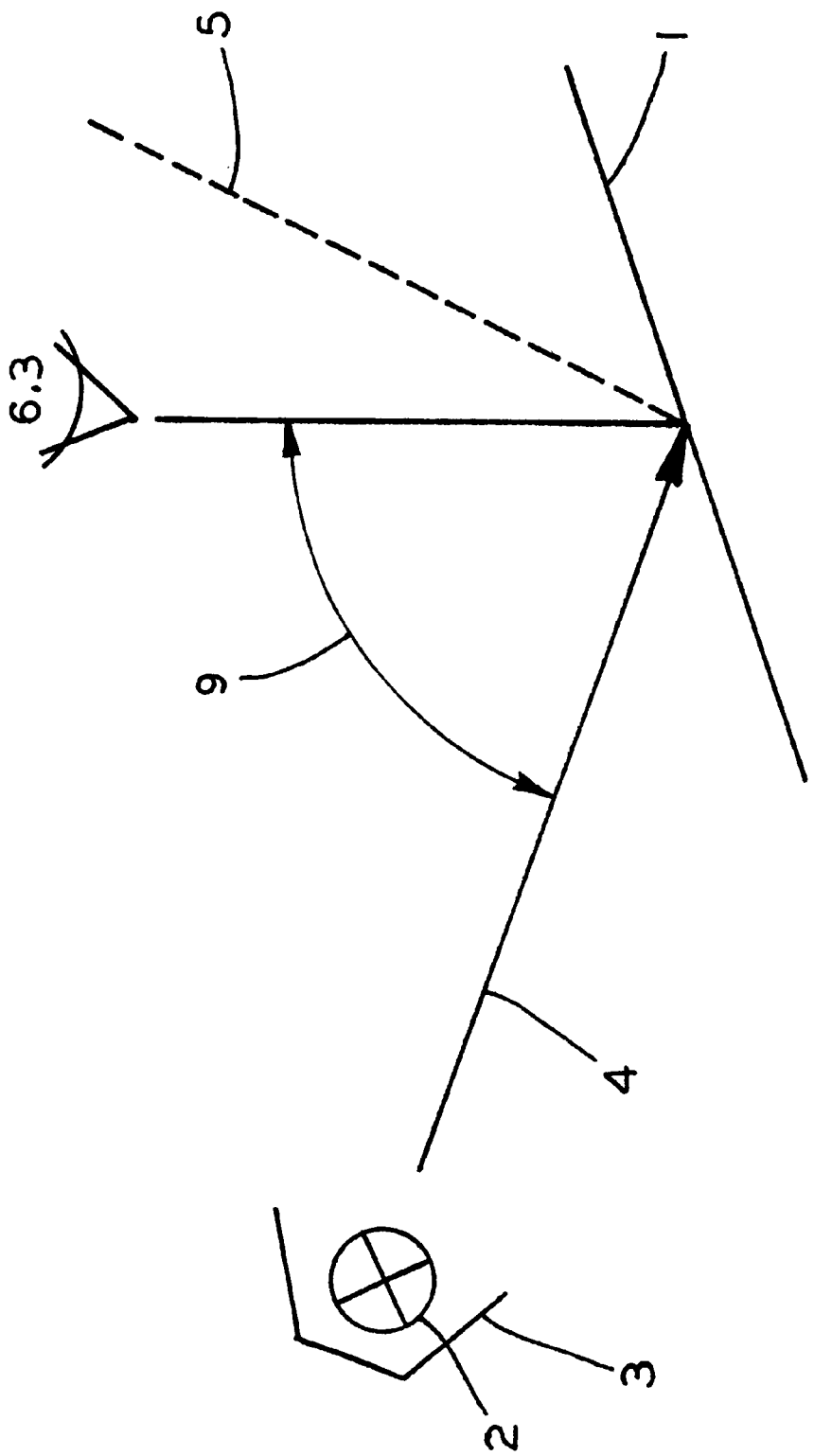

FIGS. 4, 5 and 6 show the conditions according to FIGS. 1 and 2 with viewing directions 6.2, 6.1 and 6.3 always fixed in space according to the observation position 6 and different angles of observation 8, 7 and 9 which are set by pivoting the lighting device or lamp 20 together with the sample 1 in fixed coordination with each other.

In the embodiment shown according to FIG. 1 and FIG. 2 the lighting device is held in a housing 15 designed as a table box and radiates from bottom to top, the observation position 6 being located above the space needed to pivot the lighting device. Naturally the housing or the lighting device 20 can be located above the sample 1, so that the light beam 4 is directed obliquely from top to bottom. Also a construction of the sample holder and lighting device on a horizontal platform is conceivable, in which case the axis of rotation of the sample 1 would be vertical.

In general it can be said that the fixed relationship between observation position 6 and sample 1, preferably the axis of rotation 17 of the sample 1, and the fixed coordination between sample and lighting device, is essential, sample and lighting device being pivoted together about the same axis of rotation so that different angles of observation can be set. Here care should be taken that screens screen off the samples or lighting device in such a way that the observer or a corresponding measuring device does not look into the radiating surface. Furthermore no extraneous light is to fall on the sample.

The sample 1 can consist of several sample elements which are arranged adjacent or above each other, in which one sample element can constitute a reference sample for comparison with the other sample elements.

Figure 7:
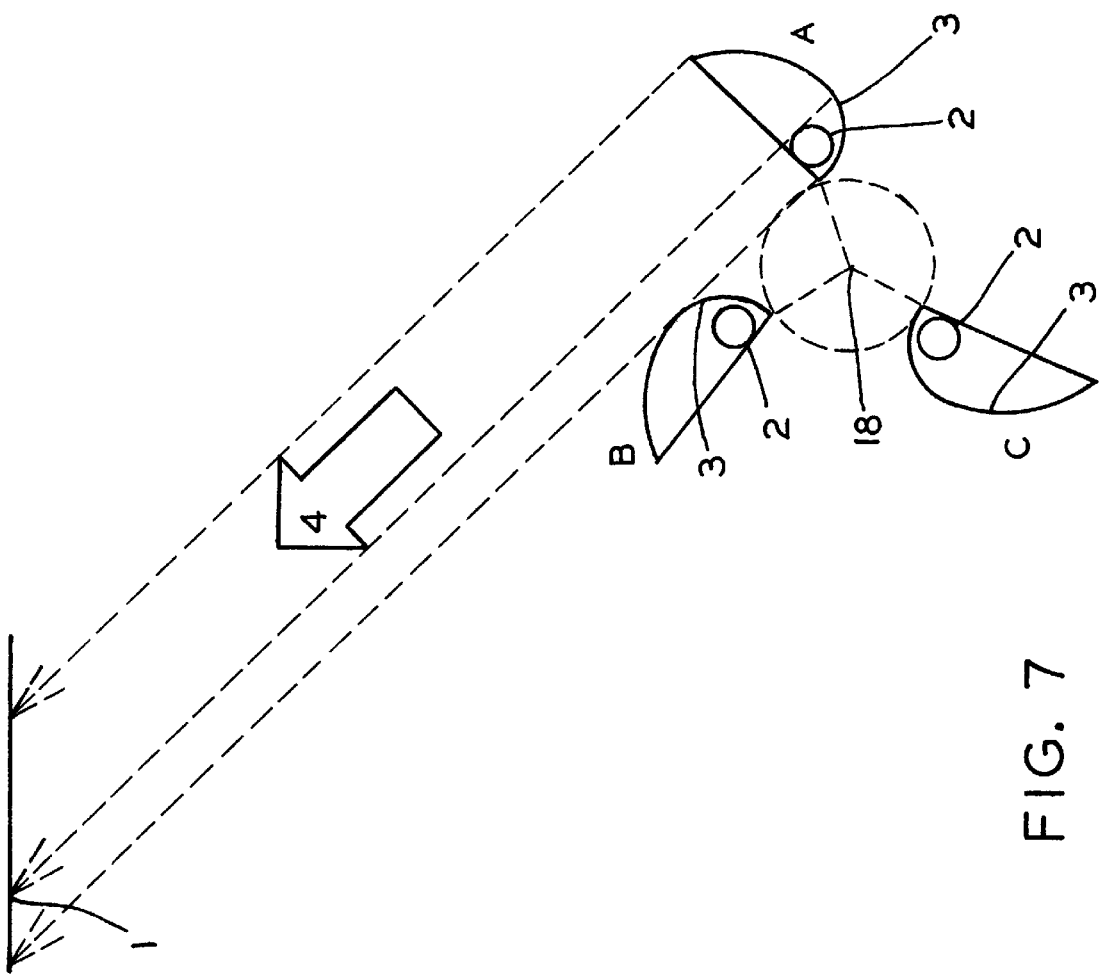
FIG. 7 a lighting device according to a further practical example.

In FIG. 6 and FIG. 7 are schematically shown lighting devices which can be used in the present invention. In FIG. 6 is shown a tubular bulb 2 with a channel reflector 3, and bulb and reflector form a translationally symmetrical lamp 20. The lamps for illuminating the sample can however also be constructed rotationally symmetrically according to FIG. 7, a point light source which is surrounded by a rotationally symmetrical reflector 3 being provided in FIG. 7. Both reflectors irradiate the sample with the light beam 4 from oblique directions. It turned out that a lamp geometry according to FIG. 6 provides better correspondence to the color impression in case of observation outdoors. The bulbs 2, which can be both linear or tubular (e.g. low-pressure fluorescent lamps) and point-like or compact, must, in connection with the reflectors 3 and if necessary covers and filters (not shown), have the desired spectral distribution for color matching, which is usually predetermined with the different visual functions. Particularly favorable are fluorescent lamps with suitable properties.

At the observation position 6 can be provided both an observer and a colorimetric device. The colorimetric device detects the spectral beam density of the sample and calculates therefrom if necessary the color locations of the colored sample.

In the practical examples described above, the different angles of observation are obtained by pivoting the lighting device 20 together with the sample into positions 10, 11 and 12. Instead of the preset positions, however, continuous pivoting can be carried out to determine color locations when the angles of observation are continuously changing.

In FIG. 7 is shown a partial view of a further practical example in which the lighting device 20 comprises several lamps which are connected to each other by a rotating or pivoting device 18, in such a way that one of the desired lamps can be moved in each case into the position in which the sample 1 is illuminated by the light beam 4. Here the lamps have different spectral light distribution, as a result of which the samples can inter alia be tested for metamerism. The three different lamps A, B and C can thus be equipped with different bulbs 2 and if necessary different reflectors 3, and in the embodiment shown moved into the respective nominal position by rotation with the rotating device.

What is claimed is:

1. An apparatus for the color matching or colorimetry of colored samples, which is arranged in a sample support, with a lighting device which illuminates the sample in a main beam direction and an observer provided at an observation position or a measuring device arranged at an observation position, the sample and observation position having a fixed coordination with each other, characterized in that the sample and the lighting device are arranged in fixed coordination with each other and in that, to set different angles of observation between the direction of observation from the observation position to the sample and the main beam direction, the sample and the lighting device are pivotable about a common axis of rotation.

2. An apparatus according to claim 1, characterized in that the sample is illuminated from a main beam direction of about 45° and in that the sample is rotatable together with the lighting device in such a way that, with the observation position preset in a fixed location, all the angles of observation needed for assessment of the sample can be set.

3. An apparatus according to claim 1, characterized in that the distance between lighting device and sample is less than the distance between observation position (6) and sample.

4. An apparatus according to claim 1, characterized in that the lighting device comprises at least one light source and a reflector, the light source being linear and the lighting device translationally symmetrical.

5. An apparatus according to claim 1, characterized in that the lighting device comprises at least one light source and a reflector, the light source being a point and the lighting device rotationally symmetrical.

6. An apparatus according to claim 1, characterized in that the axis of rotation about which the sample and the lighting device are pivoted together, is arranged in the sample surface or in the immediate vicinity of the sample surface.

7. An apparatus according to claim 1, characterized in that several samples are arranged adjacent or above each other.

8. An apparatus according to claim 1, characterized in that the measuring device is constructed as a colorimetric device which detects the spectral density of the sample and determines the color locations.

9. An apparatus according to claim 1, characterized in that the lighting device comprises lamps comprising several light sources and reflectors with different spectral radiation properties, the lamps being capable of being moved selectively by a rotating/pivoting device into the position which serves to illuminate the sample.

* * * * *